US011520908B2

(12) United States Patent
Buck et al.

(10) Patent No.: US 11,520,908 B2
(45) Date of Patent: Dec. 6, 2022

(54) SELF-MANAGEMENT OF DEVICES USING PERSONAL MOBILE DEVICE MANAGEMENT

(71) Applicant: Lookout Inc., San Francisco, CA (US)

(72) Inventors: Brian James Buck, Livermore, CA (US); Aaron David Cockerill, Los Gatos, CA (US)

(73) Assignee: LOOKOUT INC., San Francisco, CA (US)

( * ) Notice: Subject to any disclaimer, the term of this patent is extended or adjusted under 35 U.S.C. 154(b) by 0 days.

(21) Appl. No.: 16/800,647

(22) Filed: Feb. 25, 2020

(65) Prior Publication Data

US 2020/0334365 A1 Oct. 22, 2020

Related U.S. Application Data

(60) Provisional application No. 62/878,283, filed on Jul. 24, 2019, provisional application No. 62/835,382, filed on Apr. 17, 2019.

(51) Int. Cl.
  *G06F 21/60* (2013.01)
  *G06F 21/62* (2013.01)
  *H04W 4/029* (2018.01)
  *G06F 21/12* (2013.01)
  *G06F 21/53* (2013.01)

(52) U.S. Cl.
  CPC .......... *G06F 21/604* (2013.01); *G06F 21/121* (2013.01); *G06F 21/53* (2013.01); *G06F 21/6245* (2013.01); *H04W 4/029* (2018.02); *G06F 2221/034* (2013.01); *G06F 2221/2149* (2013.01)

(58) Field of Classification Search
  CPC ...... G06F 21/604; G06F 21/121; G06F 21/53; G06F 21/6245; G06F 2221/034; G06F 2221/2149; H04W 4/029
  See application file for complete search history.

(56) References Cited

U.S. PATENT DOCUMENTS

| 8,655,307 | B1* | 2/2014 | Walker | H04W 68/005 |
| | | | | 455/405 |
| 8,656,016 | B1* | 2/2014 | Bender | H04L 41/50 |
| | | | | 709/225 |
| 9,367,705 | B2* | 6/2016 | Ryerson | G06F 21/6245 |
| 2006/0014547 | A1* | 1/2006 | Walter | H04L 67/18 |
| | | | | 455/456.1 |

(Continued)

OTHER PUBLICATIONS

NPL Search (InnovationQ) (Year: 2021).*

*Primary Examiner* — Mohammed Waliullah
(74) *Attorney, Agent, or Firm* — David R. Stevens; Stevens Law Group (57) ABSTRACT

An operating system of a mobile device defines an interface for an MDM to ensure security of the device. A private personal MDM (PPMDM) instead interfaces with the operating systems and one or more enterprise MDMs (EMDM) implement security policies through the PPMDM subject to user control. Data may be flagged as associated with an EMDM based on source or location to enable deletion due to theft or disassociation with an enterprise. Blocks or threat detection according to an EMDM policy may be reported to an EMDM in a non-invasive manner.

18 Claims, 8 Drawing Sheets

(56) References Cited

U.S. PATENT DOCUMENTS

| | | | |
|---|---|---|---|
| 2011/0047594 A1* | 2/2011 | Mahaffey | G06F 21/564 726/1 |
| 2011/0162089 A1* | 6/2011 | Hinton | G06F 21/6218 726/30 |
| 2012/0302204 A1* | 11/2012 | Gupta | H04M 3/42221 455/406 |
| 2013/0237191 A1* | 9/2013 | Mahaffey | H04W 12/12 455/411 |
| 2013/0290690 A1* | 10/2013 | Nucci | G06F 16/168 713/1 |
| 2014/0040979 A1* | 2/2014 | Barton | H04W 12/30 726/1 |
| 2014/0115158 A1* | 4/2014 | Bender | G06F 15/16 709/225 |
| 2014/0215344 A1* | 7/2014 | Ligman | H04L 41/22 715/736 |
| 2014/0282828 A1* | 9/2014 | Stuntebeck | G06F 21/62 726/1 |
| 2014/0282829 A1* | 9/2014 | Dabbiere | H04L 63/10 726/1 |
| 2014/0344420 A1* | 11/2014 | Rjeili | H04L 67/10 709/220 |
| 2014/0351205 A1* | 11/2014 | Fennell | G06F 16/22 707/736 |
| 2014/0380425 A1* | 12/2014 | Lockett | H04L 63/08 726/4 |
| 2015/0222637 A1* | 8/2015 | Hung | H04L 63/20 726/1 |
| 2015/0264052 A1* | 9/2015 | Cho | H04W 8/18 713/176 |
| 2015/0278488 A1* | 10/2015 | Batchu | G06F 21/6218 726/29 |
| 2015/0317478 A1* | 11/2015 | Barton | G06F 21/55 726/23 |
| 2016/0314299 A1* | 10/2016 | Almer | H04L 63/0428 |
| 2016/0321452 A1* | 11/2016 | Richardson | G06F 21/50 |
| 2016/0358432 A1* | 12/2016 | Branscomb | H04L 61/35 |
| 2016/0359862 A1* | 12/2016 | Riva | G06F 21/6218 |
| 2016/0378665 A1* | 12/2016 | Li | G06F 16/172 711/129 |
| 2017/0329966 A1* | 11/2017 | Koganti | G06F 21/554 |
| 2018/0255101 A1* | 9/2018 | Adam | H04L 63/20 |
| 2018/0255102 A1* | 9/2018 | Ward | H04L 63/20 |
| 2018/0359244 A1* | 12/2018 | Cockerill | H04L 63/0876 |
| 2019/0200283 A1* | 6/2019 | Graybeal | H04W 12/50 |
| 2020/0110878 A1* | 4/2020 | Hu | G06F 9/45558 |

* cited by examiner

SELF-MANAGEMENT OF DEVICES USING PERSONAL MOBILE DEVICE MANAGEMENT

RELATED APPLICATIONS

This application claims the benefit of U.S. Provisional Application Ser. No. 62/835,382 filed Apr. 17, 2019 and entitled Self Management of Devices using a Personal Mobile Device Management Solution and U.S. Provisional Application Ser. No. 62/878,283 filed Jul. 24, 2019, and entitled Mobile Security.

BACKGROUND

In a modern enterprise, there is a wide array of devices in use by members of the enterprise, all of which may store or generate sensitive data. It is in the interest of the enterprise to protect the security of its data on each device on which it may be found. However, some devices may also be used for personal matters by a member of the enterprise or while the member of the enterprise is conducting personal matters.

Accordingly, there is a need to balance the need for security with protection of privacy.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, Objective-C, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
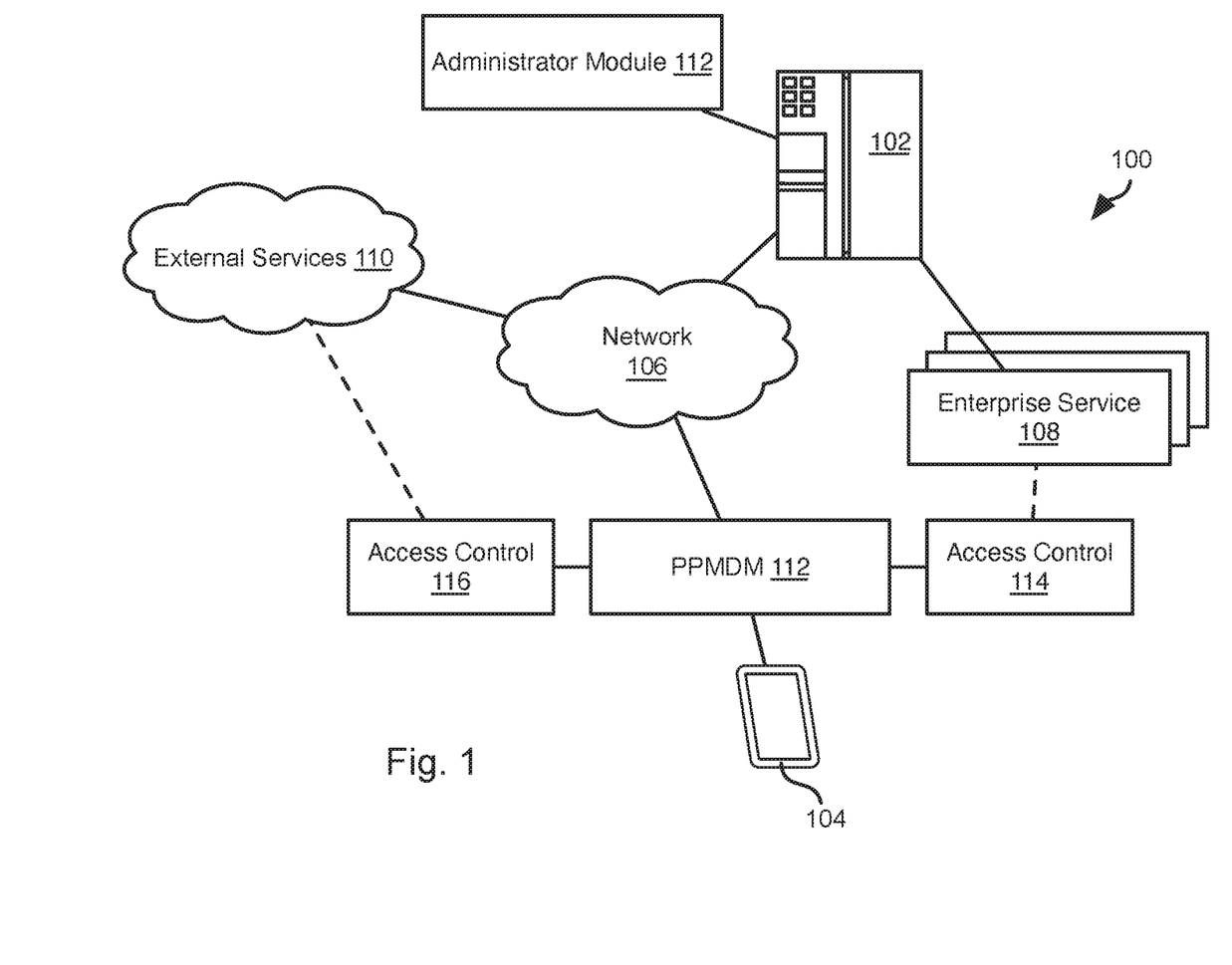
FIG. 1 is a schematic block diagram of a network environment for performing methods in accordance with an embodiment of the present invention.

FIG. 1 illustrates a network environment 100 of an enterprise in which the systems and methods disclosed herein may be implemented. The network environment 100 may include a server system 102 that includes one or more computers.

Members of the enterprise may use various devices 104. The devices 104 can include devices such as a smartphone, a laptop computer, a desktop computer, a mobile subscriber communication device, a wearable computing device, a personal digital assistant (PDA), a tablet computer, an electronic book or book reader, a digital camera, a video camera, a video game console, a voice controlled assistant, a drone, a UAV, a vehicle, a personal robot, a robotic appliance, a smart TV, a set top box, a router, a cable modem, a tablet, a server, a smart fabric, an ambient computing device (located in a mostly fixed location in a room or location, available to multiple users located in the vicinity of the device, smart rooms, etc.) and/or any other suitable computing device. The devices 104 may also include devices that are part of what is called "the internet of things" (IoT). In the IoT there are multiple devices which operate without accompanying and attendant users. Such devices can be mobile or sessile; they can have various sensors and computing and communication capabilities and can run applications; schematically they can be considered substantially similar to a mobile device.

The systems and methods disclosed herein are particularly applicable where at least a portion of the devices 104 are mobile and can be expected to change location over time. The mobile devices 104 may execute a mobile operating system such as IOS, ANDROID, GOOGLE CHROME OS, or the like. The user devices 104 may also be desktop computers or other server computers executing an operating system such as MACOS, WINDOWS, LINUX, or the like.

The devices 104 may interact with the server system 102 by way of a network 106, such as a local area network (LAN), wide area network (WAN), the Internet, or any other type of wired or wireless network connection. Mobile devices 104 may communicate via the Internet over a cellular data network, WI-FI or other communications technologies, or other portable computing devices (e.g., devices that pair with a mobile device using BLUETOOTH, such as an APPLE watch).

The server system 102 may function as a security server. For example, the server system 102 may function as an Identity Access Management (IAM) server, or a device management server (such as an MDM (mobile device management) server or an EMM (enterprise mobility management) server. The server system 102 may implement one or more enterprise services 108, such as file servers, database servers, or other custom server applications performing functions specific to the enterprise.

The mobile device 104 may further access other services 110 provided by third parties for the benefit of the enterprise, such as SALESFORCE, WORKDAY, OFFICE 365, or the like.

As discussed in detail herein, the mobile device 104 may include software implementing private personal mobile device management (PPMDM), e.g., a PPMDM module 112. The PPMDM module 112 provides device management in order to increase security of the device 104 and to implement policies of one or more enterprises associated with one or more servers 102, enterprise services 108, and external services 110 provided on behalf of the one or more enterprises. As discussed below, the PPMDM module 112 implements security policies subject to the control of the user of the device 104 and in a manner that preserves the privacy of the user. In particular, the PPMDM module 112 may be under the exclusive control of the user. Accordingly, the PPMDM module 112 may implement access controls 114 with respect to the enterprise services 108 and/or access controls 116 with respect to external services 110.

Figure 2:
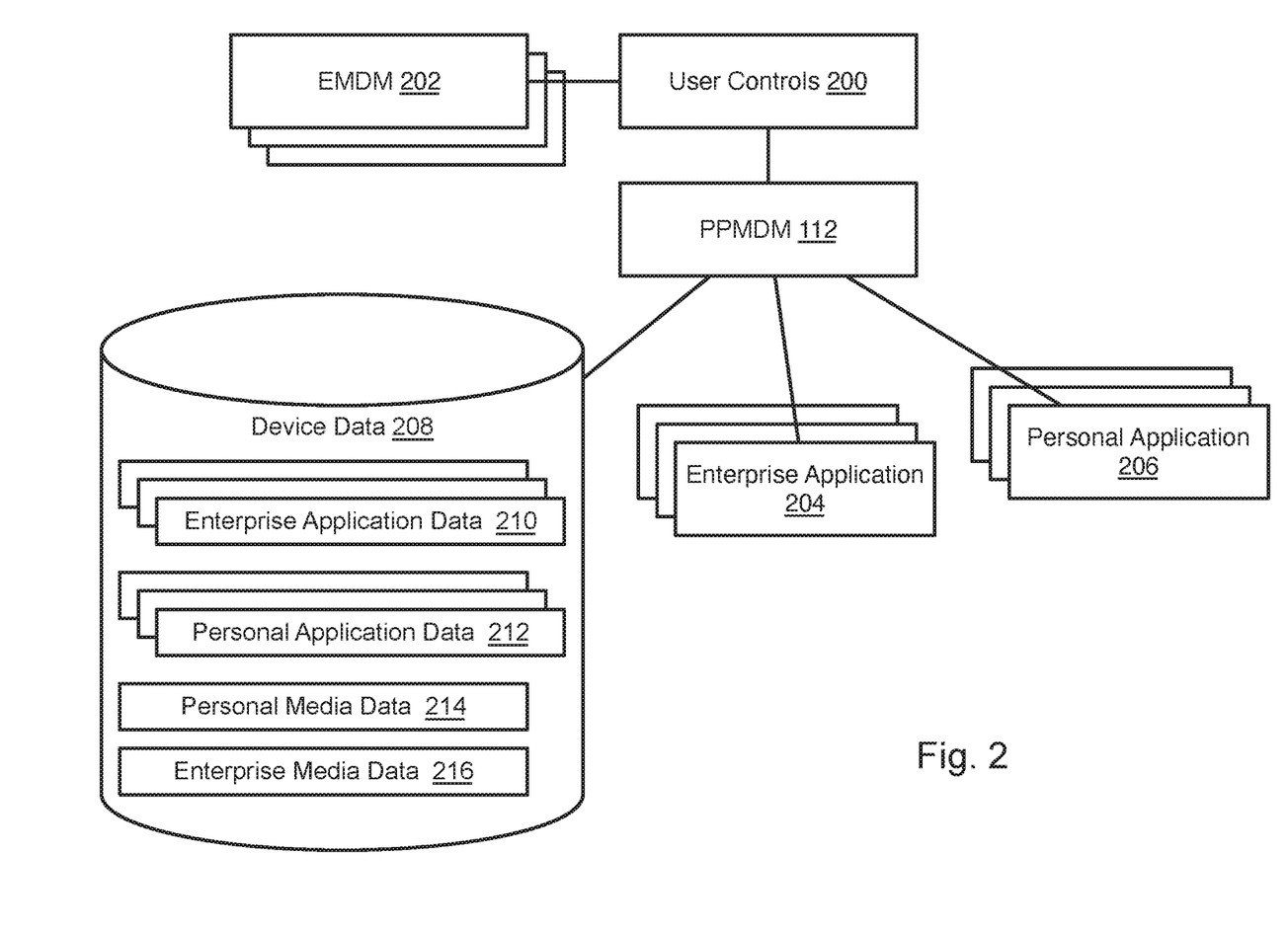
FIG. 2 is a process flow diagram of components for implementing private personal mobile device management (PPMDM) on a user device in accordance with an embodiment of the present invention.

FIG. 2 illustrate components on the device 104 that may be used to implement the functions of the PPMDM module 112. The PPMDM module 112 may operate in accordance with respect to user controls 200. The user controls 200 are based on user inputs and specify permissions with respect to one or more enterprise mobile device management (EMDM) modules or policies 202. In particular, the device 104 may execute EMDM modules 202 that are executable code executing on the device 104 subject to control and limitations imposed by the PPMDM module 112. Alternatively, EMDM policies 202 are used that specify actions to be performed, with the actual actions being performed by the PPMDM module 112 in accordance with the EMDM policies 202. In the following disclosure, EMDM modules 202 are disclosed as performing functions according to an EMDM policy. It shall be understood that this functionality may be substituted with EMDM policies 202 that are implemented by the PPMDM module 112.

In at least one embodiment, the EMDM module 202 can process requests to access resources associated with the device 104. The resources can include data (i.e., contacts, browsing information), sensor data (i.e., location), application data (i.e., applications installed on device), device data (i.e., OS version), etc. In at least one embodiment, the PPMDM module 112 can be used to approve some of the requests associated with the EMDM module 202 and reject others. In at least one embodiment, the PPMDM module 112 can be used to provide an alternative access (alternative resource) in response to a request. For example, if a request associated with the EMDM module 202 includes a request for access to a resource "constant location data of the device," the PPMDM module 112 can be used to reject access to the resource "the constant location data of device" access request but instead offer an alternative resource which includes sharing a location notification if a user leaves a geographic area (i.e., the country). In at least one embodiment, the alternative resource can include access to only part of the data requested or access only in specific locations or during specific days, dates, and/or times.

The EMDM modules 202 may specify performing any monitoring or implementing any restrictions or reporting known in the art for a mobile device management (MDM) solution as known in the art. The EMDM modules 202 may also specify the performance of activities performed by enterprise mobility management (EMM) and mobile application management (MAM) solutions as known in the art. The PPMDM module 112 may interface with APIs (application programming interface) in the operating system of the device 104 for facilitating performance of MDM. For example, the device 104 is enrolled in management by the PPMDM module 112 and functions as the MDM of the device, such as those MDM functions defined by the APIs of the operating system.

However, the PPMDM module 112 is under the exclusive control of the user and the PPMDM module 112 is the only administrator of the MDM, MAM, and/or EMM functions on the device 104. The MDM may be exclusively coupled to the PPMDM. Therefore, only the user of the device 104 is enabled to control these functions. In general, any capability provided by a management framework on a mobile operating system can be delegated by the PPMDM module 112 for use by EMDM module 202 for which the PPMDM module 112 has approved for limited policy or other management activities. Such decisions of delegation by the user of the PPMDM module 112 can be changed or revoked at any time, because the user of the PPMDM module 112 is always in control.

In one example, IOS and ANDROID define MDM interfaces that may be used by an MDM module to implement monitoring, restricting, and reporting to promote device security. Accordingly, the PPMDM module 112 may be configured as the MDM to interface with these APIs. The API for IOS has two management modes: supervised or managed. ANDROID has two management modes: fully managed and fully managed with a work profile. For both operating systems, when a device is managed, there are significant data and privacy concerns for a user of the device 104. Using these APIs, a MDM may locate the device, wipe the device, sell all browsing and other activity, see all installed applications, and control a large number of permissions, settings, and capabilities of the device.

These concerns are reduced by use of a PPMDM module 112 to interface with these APIs as described herein. For example, an EMDM module 202 may have access to information about the device 104 that has been provided to it by the PPMDM module 112. The determination of which information is shared by the PPMDM module 112 to the EMDM module 202 is under the control of the user of the PPMDM module 112. The determination of which policy (ies) will be enforced by the PPMDM module 112, where at least some of the policies are obtained from the EMDM module 202, is also under the control of the user of the PPMDM. The determination of which actions that affect the state of the device can be delegated to the EMDM module 202 is under the control of the user of the PPMDM module 112.

For example, the PPMDM module 112 may obtain an application inventory on the device 104 only for the purposes of checking for malware or risky applications. This inventory is not shared with the EMDM module 202. Instead a result of the inventory, e.g. no malware present, malware present, 1 risk application present, etc. may be shared without identifying the actual applications identified in the inventory.

The separation of visibility and control functions in this manner meets the user's need for privacy and data integrity and that meets the enterprise's needs for ensuring that continuous conditional access (CCA) policies can be in place and enforced.

The user controls 200 may specify consent to implementation of the EMDM modules 202. The user controls 200 may additionally require obtaining of user permission before performing certain actions according to an EMDM module 202 that the user has already consented to implement. For example, wiping of the device 104 or performing a factory reset when required by an EMDM module 202 may be permitted by the PPMDM module 112 only upon receiving permission for this specific action from the user. Various examples of the interaction between the user controls 200, EMDM modules 202, and PPMDM module 112 are described in greater detail below.

The PPMDM module 112 may manage access of enterprise applications 204 that may each be subject to control of the EMDM module 202 of an enterprise. There may be multiple EMDM policies 202 such that different enterprise applications 204 are subject to different EMDM policies 202. The device 104 may host personal applications 206 that are not associated with an enterprise of a specific EMDM module 202 but that may be managed by the PPMDM module 112 at least in part subject to the control of one or more EMDM modules 202 in order to promote security of the device 104.

The device 104 may store device data 208, such as on a flash drive or other persistent storage device. The device data 208 may include enterprise application data 210 that is data associated with a particular enterprise application 204 and is created and used by that application 204. The enterprise application data 210 for an enterprise application 204 may be subject to control by the EMDM module 202 associated with that application 204. The device data 208 may include personal application data 212 that is associated with a particular personal application 206, text messages, emails, or other personal data of the user. The personal application data 212 may be excluded from control by EMDMs 202 and the PPMDM module 112 may prevent access to this data 212 by an enterprise when implementing EMDM policies 202.

Other data 208 may include personal media data 214, such as audio recordings, images, and/or video recordings captured by the user using the device 104. The personal media data 214 may be protected from access by an enterprise by the PPPMDM module 112. There may likewise be enterprise media data 216 that is audio recordings, images, and/or video recordings captured using the device 104 but that are subject to management by an EMDM module 202 and are flagged as being associated with a particular EMDM module 202 to enable this management.

Figure 3:
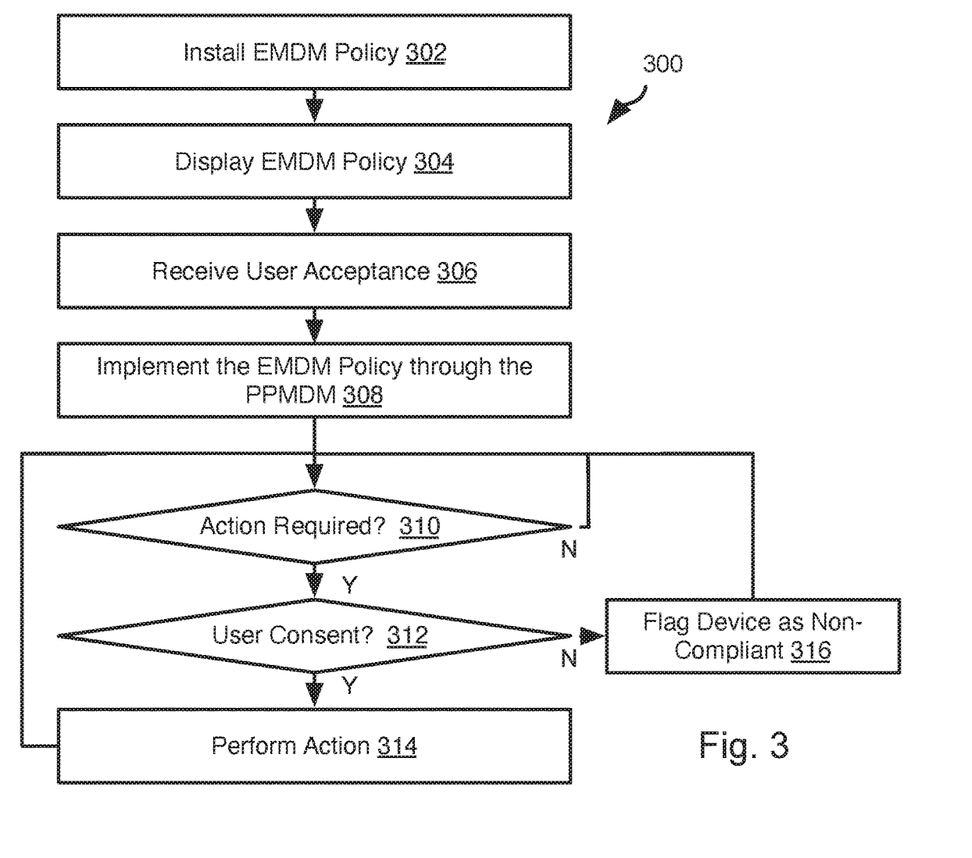
FIG. 3 is a process flow diagram of a method for performing PPMDM in accordance with an embodiment of the present invention.

FIG. 3 illustrates a method 300 that may be executed by the PPMDM module 112. The method 300 may include installing 302 an EMDM module 202 on the device 104, such as by a user, the PPMDM module 112, or some other component on the device 104. The EMDM module 202 may be that of an enterprise the user is associated with and step 302 may be performed in response to an instruction from the server system 102 of the enterprise and the EMDM module 202 may be downloaded from the server system 102.

In some embodiments, the method 300 may be invoked in response to installation 302 of the PPMDM module 112. For example, a user may install the PPMDM module 112 on the user's device 104. Upon executing the PPMDM module 112, the user is provided the option to enable the device for corporate access, i.e. by subscribing to one or more EMDM modules 202.

In another embodiment, a user visits a PPMDM cloud service in a web browser to perform initial enrollment. The user may be using a browser on the device 104 which will be put under PPMDM management, or a browser on a different device.

In another embodiment, a user may be invited to put the user's device under PPMDM management by a message (email, SMS, or other messaging medium) from the user's employer. The message includes a link to download and install the PPMDM module 112 and links to the information necessary for the user to connected the PPMDM module 112 to the employer company to enable the device for corporate access, e.g., download and configure an EMDM module 202 for the employer company.

The method 300 may include displaying 304 a representation of the policies of the EMDM module 202 to a user of the device 104 and receiving 306 user acceptance of the EMDM module 202, either as a whole or as individual components of the policy implemented by the EMDM module 202. In particular, the displaying of step 304 may include displaying an interface element for receiving user acceptance or refusal of the EMDM module 202. In the event that the user refuses to accept the EMDM module 202, the PPMDM module 112 may communicate this to the server system 102, which may then take actions such as denying access by the device 104 to enterprise services 108 or external services 110 associated with the enterprise.

In some embodiments an administrator console, such as a web-based console, may be displayed one the device 104 for the user to administer the PPMDM module 112. The user can permit the PPMDM module 112 to be "subscribed" to policies from a particular EMDM module 202. The PPMDM module 112 may also invoke display of a device's security state/score in the console. The console may be simplified and lack the ability to define MDM policies. Instead, the console may permit viewing of policies obtained from the EMDM modules via its subscription to them. In some embodiments, an advanced console can be made available to allow the user to modify or add to policies.

In some embodiments, a user may have multiple devices 104 or may have multiple devices 104 used by family members all of which are to be subscribed to the same EMDM modules 202 and granted the same permissions as one of the devices 104. The user may therefore download the PPMDM module 112 on each of these devices 104 and create an association between the PPMDM module 112 and the PPMDM module 112 on another device 104. For example, device A may be a primary device and the PPMDM module 112 of secondary device B may be associated with the PPMDM module 112 of device A such that subscriptions to EMDM modules 202 and other permissions granted by the user on the primary device will be implemented on the secondary device B. This association may be accomplished by associating each module 112 with an account of the user in a cloud-based service and specifying with the cloud-based service that the PPMDM module on device A is primary. Thereafter, user inputs to the PPMDM module 112 on device A will be transmitted from device A to device B and implemented on device B.

In response to receiving 306 user acceptance of an EMDM module 202, the PPMDM module 112 may then implement 308, or permit implementation of, the EMDM module 202. In particular, this may include the EMDM module 202 performing some or all of the conventional actions of an MDM as specified in the policy of the EMDM module 202 subject to the control of the PPMDM module 112, which prevents access to personal data of the user. In particular, the PPMDM module 112 may access user location information, determine applications present on the device, perform malware checks, and the like. The PPMDM module 112 may verify performance of security measures (e.g., requiring a passcode), monitoring of URLs (uniform resource locators) accessed, blocking access to URLs, implementing conditional access to enterprise or external services 108, 110, and other MDM functions. Where the EMDM module 202 requires sending information back to the server system 102, this information may be reduced by the PPMDM module 112 to a score or a binary compliant/non-compliant value that does not include personal user data.

In this manner, the PPMDM module 112 is able to perform the functions of an MDM while at the same time protecting privacy of the device 104 and the user and subject to the control and direction of the user.

The method 300 may further include evaluating 310 whether an accepted EMDM module 202 requires an action. If so, the method 300 may include soliciting consent of the user to the action. If the user is found 312 to consent, then the action is performed 314. If not, then the action is not performed. However, the device 104 may be flagged 316 as being non-compliant with respect to the EMDM module 202, which may include transmitting a notification to the server 102 of the enterprise that provided the EMDM module 202, the notification indicating that the device 104 is non-compliant. The server system 102 may then take action such as denying access by the device 104 to enterprise services 108 or external services 110 associated with the enterprise.

Note that the evaluation of step 312 may be performed for certain actions that require user consent subsequent to consenting to the policies of the EMDM module 202. Some actions may be performed after receiving consent to the policies of the EMDM module 202 without requiring additional consent. For example, step 312 may be performed for actions such as wiping of the device 104, performing a factory reset, or performing other actions that will be inconvenient or invasive for the user.

In at least one embodiment, the enrollment can be initiated by the user. For example, when a user already has the EMDM module 202 on the device 104, the user can enter new enterprise information into the EMDM module 202 to enroll. In some embodiments, the user can enter domain name of the enterprise, which is used to locate a PPMDM enterprise bridging server which can obtain info and/or policies of the enterprise for the device or the user, such as from the server system 102 of the enterprise. The association process may involve an authentication of the user with respect to the enterprise server 102. The enterprise server 102 may choose to allow or disallow the device/user to subscribe to enterprise policies. Based on the enterprise policy(ies) the user at the device 104 is presented a list of policy items to which the user can select to accept or not. The decisions about which policy items were accepted is made available to the PPMDM bridging server (which forwards said info to the enterprise server 102). Based on the user decisions for policy items, and any other enterprise's policies for which the user has made decisions, an MDM profile for the device may be prepared by the PPMDM bridging server or the enterprise server 102 and sent to the device 104 for the user to accept. The possibly multiple policies may be combined in a manner described elsewhere herein.

Figure 4:
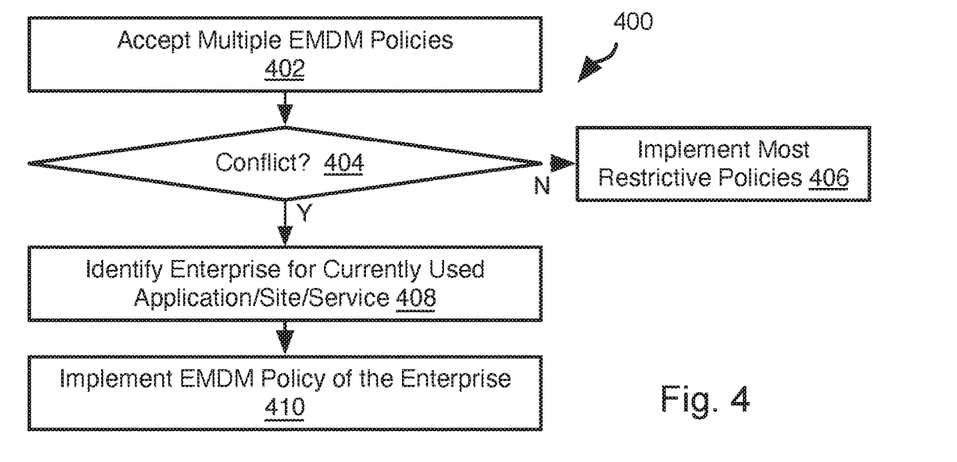
FIG. 4 is a process flow diagram of a method for managing multiple policies on the same device using PPMDM in accordance with an embodiment of the present invention.

FIG. 4 illustrates a method 400 that may be executed by the PPMDM module 112. The method 400 may be used in the case were the user has subscribed to EMDM modules 202 of more than one enterprise. The result is that the PPMDM module 112 will then attempt to honor the compliance policies from more than one organization. This is impossible to do with a traditional MDM because there is only one MDM for each device. As there are increasing numbers of contractors who perform work for more than one enterprise, this multiple enterprise association to a PPMDM module 112 is particularly helpful.

The method 400 may include accepting 402 multiple EMDM policies, such as by subscribing to multiple EMDM modules 202 (see FIG. 3) or otherwise accepting two sets of enterprise policies for mobile device management as described above.

The method 400 may include evaluating 404 whether the policies conflict. A conflict may be understood to be a policy of one enterprise that requires the violation of another enterprise. For example, if one policy requires that BLUETOOTH always being enabled whereas another policy forbids BLUETOOTH from being enabled. If not, then both policies are implemented 406 by implementing the most restrictive elements of each policy. For example, if an action or state is forbidden by one policy but permitted by another, that action will be forbidden in the combined implementation. In another example, if one policy requires performing an action (monitoring for example) and the other does not require that action, the combined policy will require performing the action.

If a conflict is found 404 to be present, the method 400 may include performing, while the multiple policies are in place, identifying 408 the enterprise (e.g., EMDM module 202 pushed by the enterprise) associated with any of the enterprise application 204, enterprise service 108, external service 110, or website that is currently being accessed on the device. The applications, services, external services that are associated with a particular EMDM module 202 and its source enterprise may be specified in the policies of the EMDM module 202 or in metadata provided with the EMDM module 202. Alternatively, enterprise applications 204 pushed to a device 104 by an enterprise may be thereafter associated with that enterprise and the EMDM module 202 that was also pushed by that enterprise. The EMDM module 202 associated with that enterprise will then be implemented 410. This may include implementing the combined policy as defined with respect to step 406 except that for the conflicting policies, the policy of the enterprise identified at step 408 will be implemented.

In at least one embodiment, the context of the device 104 is monitored to determine which of the conflicting policies need to be applied. Context can include the physical location of the device, date, WI-Fi connection, time, the apps in active use by device 104. For example, if a device 104 is associated with conflicting policies of company A company 13, the context of the location device can determine that the device 104 is in the building of company A and therefore the conflict of the policies should be resolved in favor of implementing the policy of company A. In some embodiments, the user can configure conflict resolution rules in PPMDM, In other embodiments, the PPMDM can provide suggestions of the conflict resolution rules based on policies. In at least one embodiment, the conflict resolution rules can be dynamically created based on the policies, or the conflict resolution rules of other users.

In some embodiments, if the ser attempts to use applications, services, external services, or websites from both companies at the same time, then the PPMDM module 112 can inform the user that because there are conflicting policy settings, that they cannot be both used at the same time, thereby requiring the user to quit using one of them before commencing using another. In some embodiments, the PPMDM module 112 prevents such simultaneous use. In another embodiment, the simultaneous use is not prevented by the PPMDM module 112, but the PPMDM module 112 flags the device 104 as out of compliance with the EMDM module 202 whose policy is violated as a result of the simultaneous use (e.g., the EMDM module 202 that forbids enabling BLUETOOTH when BLUETOOTH is enabled while using applications associated with the EMDM module that requires enabling BLUETOOTH). This may include notifying the server system 102 for the enterprise that provided the EMDM module 202 to indicate that the device 104 is non-compliant thereby enabling the server system 102 to take action, such as denying access to the device 104 to services 108, 110 of the enterprise.

Figure 5:
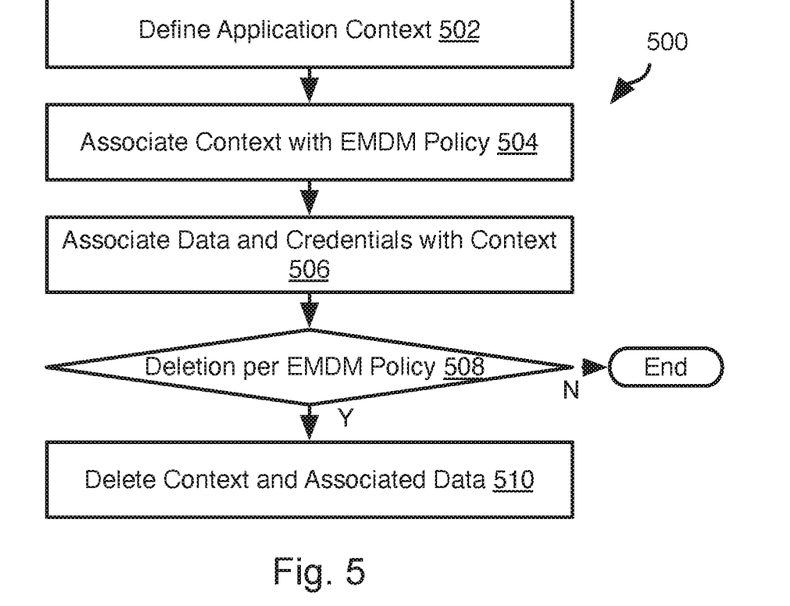
FIG. 5 is a process flow diagram of a method for providing context-based data management with PPMDM in accordance with an embodiment of the present invention.

FIG. 5 illustrates a method 500 that may be executed by the PPMDM module 112 to handle the case where a user ceases an association with an enterprise that provided an EMDM 202 to which the PPMDM module 112 is subscribed.

In a simple case, when the user ceases an association with an enterprise, the enterprise server may send a message to the EMDM module 202 that it pushed to the device, or the PPMDM module 112, and instruct the deletion of all enterprise data from the device 104. In the case of an enterprise application 204 pushed by the enterprise to the device 104 and associated only with the enterprise, the deletion of this application 204 and its data 210 is simple and may be performed by the PPMDM module 112 in response to the instruction. The deletion may be performed either with or without consent of the user depending on previously-granted permissions with respect to the EMDM module 202 of the enterprise.

In another simple case, the same application 204 is used by different enterprises each having a corresponding EMDM module or the same application is associated with an enterprise and also used for personal use. It may be that the user has different accounts for use with the application 204, each account being associated with a different enterprise or the user's personal use. This may be the case with GSUITE from GOOGLE, MS OFFICE365, BOX, DROPBOX, or others. Accordingly, deletion invoked by an enterprise as described above may include deleting the data associated with the account of the user that is associated with that enterprise.

In a more complex case, the method 500 may be performed. The method 500 may be used where multiple enterprises are associated with the same application 204 or different instances of the same application. The method 500 may include defining 502 an application context on the device for each enterprise that uses the application and associating 504 that context with an enterprise and the EMDM module for that enterprise. The enterprise application data 210 for that application for each enterprise may be associated 506 with the application context for that enterprise. The application contexts may use the same executable data of the application or may have separate copies of the executable data. The enterprise application data 210 may include account information, login credentials, and other data. Accordingly, when the application is used in a particular context, the login information for that context may be used.

If deletion for data associated with an enterprise and a particular EMDM module 202 is found 508 to be required as described above, the application context associated with it is deleted 510 along with the data and credentials associated with it at step 506.

Figure 6:
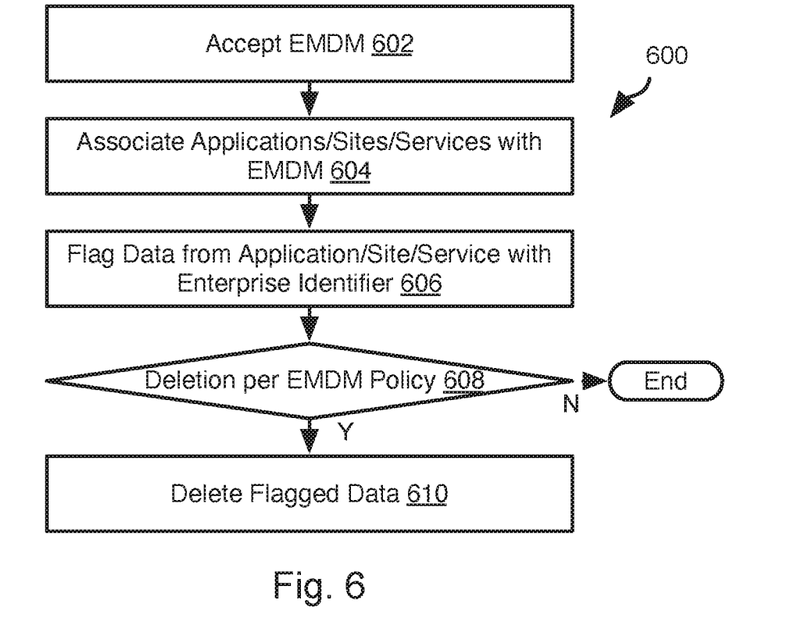
FIG. 6 is a process flow diagram of a method for associating device data with one of multiple enterprises in accordance with an embodiment of the present invention.

FIG. 6 illustrates another method 600 that may be executed by the PPMDM module 112 to handle the case where a user ceases an association with an enterprise that provided an EMDM 202 to which the PPMDM module 112 is subscribed. The approach of FIG. 6 may be used as an alternative to, or in combination with, the approach of FIG. 5.

The method 600 may include accepting 602 and EMEM policy, such as by subscribing to an EMDM module 202 as described above. The method 600 may further include associating 604 one or more enterprise applications 204, enterprise services 108, external services 110, or websites with that EMDM module 202. This association may be pushed by the server 102 that provided the EMDM module 202, such as in the EMDM module 202 itself or in metadata provided with the EMDM module 202.

In some embodiments, associating 604 may include associating a zone with an EMDM module 202, such as an office location or the location of one or more other facilities associated with the enterprise that provided the EMDM module 202. The zone may include GPS coordinates defining vertices of a polygon, a GPS coordinate and a radius, geographic entity, beacon identifiers, WI-FI access point identifier, identifier of other radio device, or other definition.

The method 600 may further include flagging 606 data received from or generated by the entities associated at step 604, e.g. downloaded or created by an associated application, data received from an enterprise service 108 or external service 110, data downloaded from a website associated at step 604, or other data. This flag may be stored with the data or the PPMDM module 112 may maintain a map that maps each item of data to the EMDM module 202, an enterprise identifier, or other value indicating that the data is flagged.

Where a zone is associated with an EMDM module 202, data captured while the device 104 is located within the zone may also be flagged as associated with the EMDM module 202 associated with that enterprise. This may include audio recordings using a microphone of the device 104 or images or video captured using a camera of the device 104. In some embodiments, text input by the user while within the zone may also be flagged as associated with the EMDM module 202. Note that the location checks to determine whether the device is in the zone for an EMDM module 202 may be performed by the PPMDM module 112 such that the EMDM module 202 does not have access to the location of the device 104.

The PPMDM module 112 may find 608 that the data for a particular enterprise and EMDM module 202 should be deleted, such as due to a condition in the policy of the EMDM module 202 being met or in response to a delete instruction from the server system 102. If so, the PPMDM module 112 may delete 610 data flagged as being associated with that enterprise and/or EMDM module 202.

Figure 7:
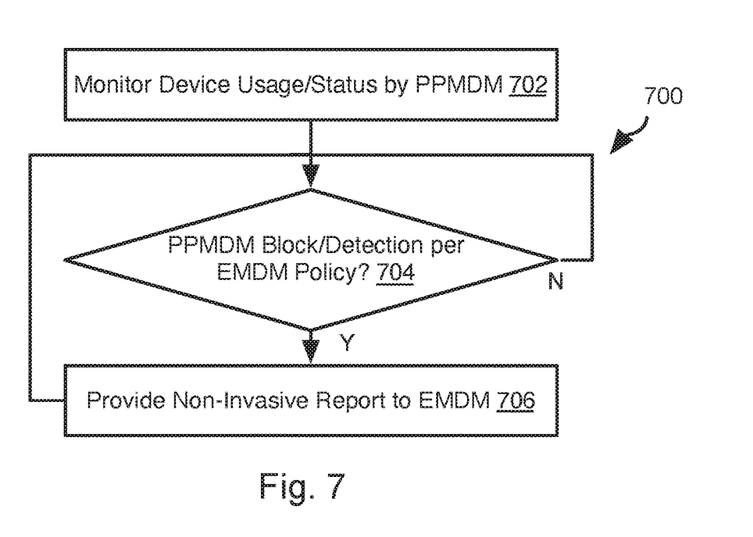
FIG. 7 is a process flow diagram of a method for implementing safe browsing using PPMDM in accordance with an embodiment of the present invention.

FIG. 7 illustrates a method 700 that may be executed by the PPMDM module 112 in order to implement safe browsing in a privacy-preserving manner. The PPMDM module 112 monitors 702 device usage and status in accordance with the policies of EMDM modules 202 to which the PPMDM module 112 is subscribed. If the PPMDM module 112 is found 704 to have blocked access to a URL or have detected some other threat, the PPMDM module 112 may block access to the URL or otherwise deny access to the threat. The PPMDM module 112 may further provide 706 a non-invasive report to either (a) the EMDM module 202 according to whose policy the URL was blocked or threat detected or (b) the server system 102 associated with the EMDM module 202. Of course, the EMDM module 202 may forward the report to the server system 102 of the enterprise with which it is associated.

Where a URL is blocked, the non-invasive report may simply report (a) that a URL has been blocked, (b) the number of URLs blocked within a time period, e.g. since a last report, (c) simply indicate that a threat prevention action was performed but not specify the nature of the threat prevention action, or (d) report that the device 104 is not compliant with the security policy of the EMDM module 202 that has a "no block" policy.

In some embodiments, an EMDM administrator may request from the PPMDM module 112 permission to access more details about a blocked URL or other threat. In some embodiments, the PPMDM module 112 may present a solicitation for permission to the user. If the user provides permission, the PPMDM module 112 may provide further details, such as the blocked URL. If permission is given, the PPMDM module 112 may send the further details to the EMDM administrator, such as by way of the server system 102 associated with the EMDM module 202.

Figure 8:
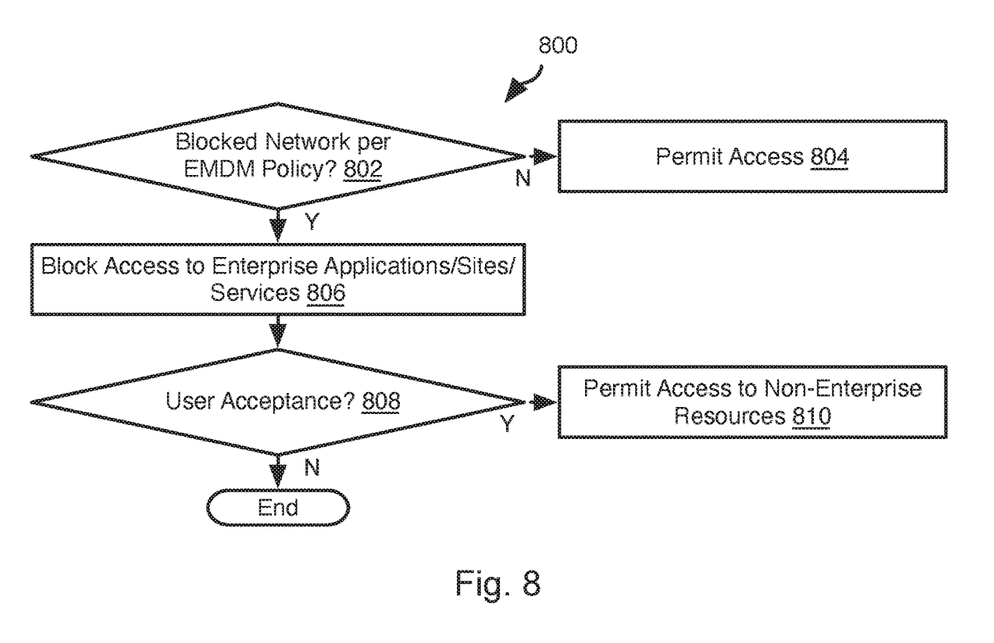
FIG. 8 is a process flow diagram of a method for blocking unsafe connections using PPMDM in accordance with an embodiment of the present invention.

Referring to FIG. 8, the illustrated method 800 may be executed by the PPMDM module 112 to handle potentially unsafe connections. The method 800 may include evaluating 802 by the PPMDM module whether a connection attempted by a user or application 204, 206 of the device 104 is unsafe according to the policy of a subscribed EMDM module 202, e.g. to a known phishing site, to a known source of malware, to an unknown computer, to a wireless access point known to be unsafe or lacking adequate security, or unsafe in some other respect.

If not, the connection is permitted 804. If so, then access to the connection is blocked 806 with respect to the enterprise associated with the EMDM module 202. This may include blocking access to enterprise services 108 or external services 110 of the enterprise associated with the EMDM module 202 over the connection. Access by and to the enterprise applications 204 of the enterprise using the connection may also be blocked.

In some embodiments, the PPMDM module 112 may prompt a user to either (a) accept blocking of all access over the unsafe connection or (b) continue access using the unsafe connection. If the user is found 808 to accept use of the unsafe connection, the PPMDM module 112 permits 810 access using the unsafe connection with respect to the personal applications 206 and enterprise applications 204 of other enterprises that did not find the connection to be unsafe according to their subscribed EMDM modules 202.

Figure 9:
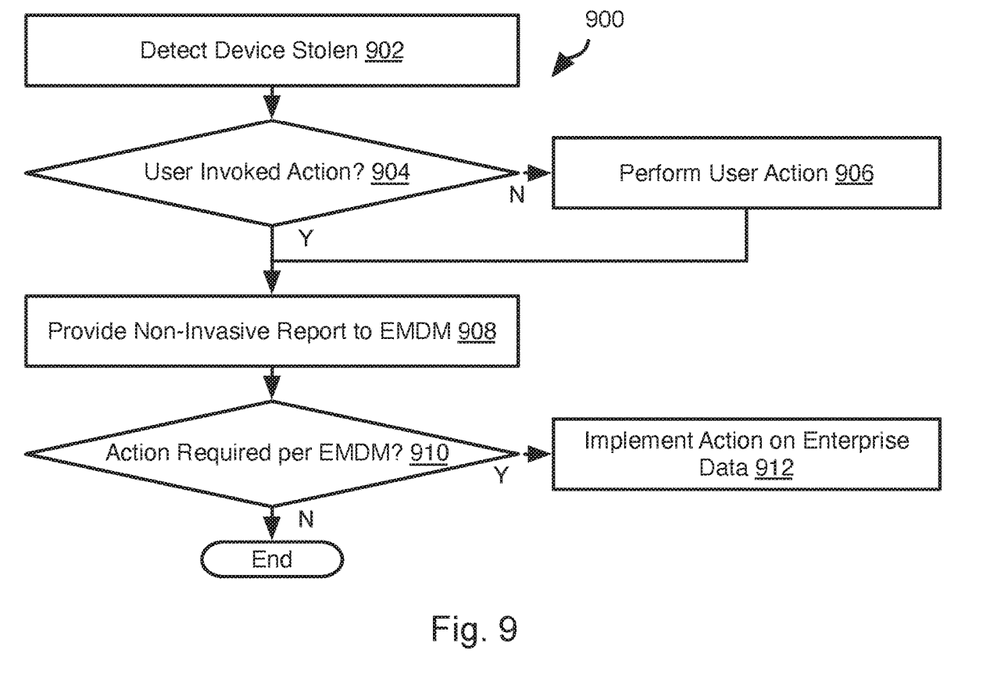
FIG. 9 is a process flow diagram of a method for handling a stolen device using PPMDM in accordance with an embodiment of the present invention.

FIG. 9 illustrates a method 900 that may be executed by the PPMDM module 112 to handle the situation where a device 104 is stolen. The method 900 may include detecting 902 that the device hosting the PPMDM module 112 was stolen. Step 902 may include receiving a notification from the user indicating that the user believes the device 104 to be stolen. Step 902 may include determining that the device 104 is stolen based on behavior with respect to the device 104, such a many failed authentication attempts, behavioral biometrics (holding position, tapping behavior, etc.) of the user that do not match those of the authenticated user, or any other approach for detecting a stolen device as known in the art. The method 900 may be executed in an identical manner in response to detecting that the device 104 is lost.

The PPMDM module 112 may evaluate 904 whether a notification is received from the authenticated user, e.g. from another device of the user, invoking a user action. Such actions may include locking the device 104 or wiping all data from the device 104. If the user is found to have invoked an action, that action is performed 906 by the PPMDM module 112. If the user invokes wiping of the device, all data for all enterprises having subscribed EMDM modules 202 may be deleted from the device.

The method 900 may further include providing 908, by the PPMDM module 112, a non-invasive report to the EMDM modules 202 on the device, or the server systems 102 of enterprises associated with the EMDM modules 202, indicating that the device is stolen. The report may be non-invasive in the sense that it does not reveal the actual location of the device 104.

The PPMDM module 112 may evaluate 910 whether the EMDM modules 202 or associated servers 102 require performance of an action due to the device being stolen. Step 910 may include evaluating whether action is required in view of any user actions invoked at step 906. If further action is found 910 to be required, then the PPMDM module 112 implements 912 this action with respect to the data associated with each EMDM module 202 requiring action. Stated differently, each EMDM module 202 may perform an action with respect to data associated with that EMDM module 202, such as according to any of the approaches above for associating data with an enterprise or EMDM module 202. This action may include wiping the enterprise data from the device 104.

In some embodiments, consenting to this wiping may be part of the subscription process (see FIG. 3) such that an enterprise may condition access to enterprise services 108 and external services 110 on the user consenting to wiping of enterprise data in the event that the device 104 is stolen. In some embodiments, wiping may also be invoked by an administrator of an enterprise associated with an EMDM module 202 communicating with the EMDM module 202 and invoking this action.

Note that in some embodiments, the PPMDM module 112 may operate in cooperation with a cloud PPMDM service and this service may invoke the wiping of the device in response to receiving a notification of the user indicating that the device is stolen. The PPMDM service may invoke wiping of enterprise data in accordance with enterprise policy of subscribed EMDM modules 202 provided to the PPMDM service upon subscribing of the EMDM modules 202 to the PPMDM module 112 on the device 104.

Figure 10:
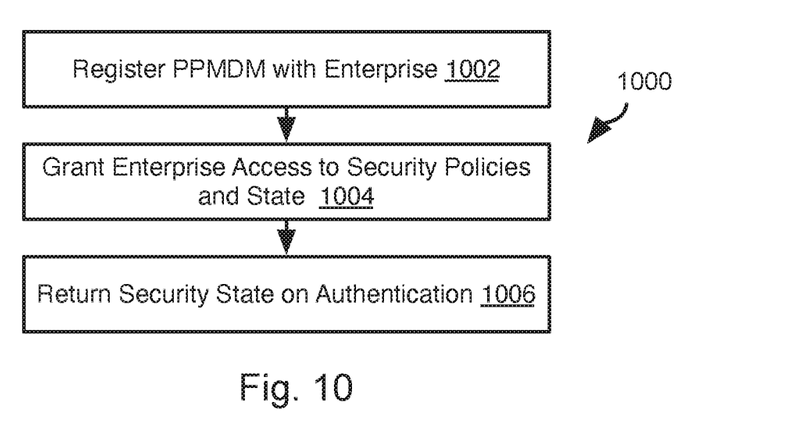
FIG. 10 is a process flow diagram of a method for an enterprise to verify security of a device using PPMDM in accordance with an embodiment of the present invention.

FIG. 10 illustrates a method 1000 that provides an alternative use for the PPMDM module 112. The method 1000 may be used by a bank, other financial institution, ecommerce merchant, doctor's office, hospital, or other enterprise that does not have an interest in managing the user's device 104 but does want to ensure that transactions with the user's device 104 are secure and to protect the user's data (e.g., to satisfy Health Insurance Portability and Accountability Act (HIPAA) requirements). Accordingly, the enterprise does not subscribe an EMDM module 202. Instead, the user registers 1002 the PPMDM module 112 of the user's device with the enterprise, e.g., a server system 102 of the enterprise, and grants 1004 the server system 102 access to the security state (e.g., result of malware scans or other checks) and security policies in place on the device 104. Registering may include creating a device identifier for the device 104 for use by the enterprise, such as a combination of a unique identifier of the device (e.g., hardware key, identifier for advertisers (IDFA) in IOS or ANDROID advertising identifier (AAI)). This device identifier may be associated by the enterprise with the user's account. The device identifier may be unique to the device and the enterprise such that it cannot be used for correlation to the user's behavior on other sites or with respect to servers of other enterprises.

Subsequently, when the user logs into the server system 102 in order to conduct transactions with the server system 102 or otherwise access the services of the server system 102, the server system 102 interacts with the PPMDM module 112 to obtain the current security state and possibly current security policies of the device 104. The PPMDM module 112 generates and returns 1006 this data (e.g., performs the security check on demand), or simply returns prerecorded data, to the server system 102. The data may be returned with the device ID. In this manner, the server system 102 may obtain assurance that the device 104 is not compromised when exchanging data with the device 104 in an authenticated session with the user. If the data returned by the PPMDM module 112 indicates that the device 104 is compromised, the server system 102 may deny access, require enhanced (e.g., two factor) authentication, or take other remedial measures.

Figure 11:
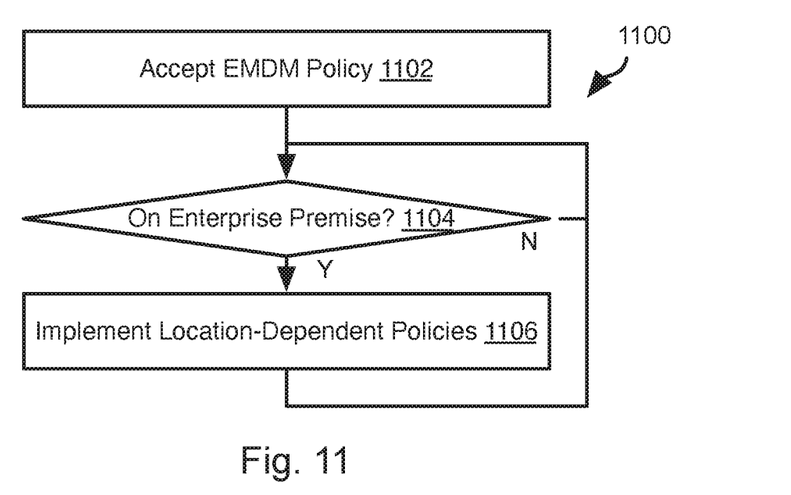
FIG. 11 is a process flow diagram of a method for providing location-based association of data using PPMDM in accordance with an embodiment of the present invention.

Referring to FIG. 11, the illustrated method 1100 may be performed by the PPMDM module 112 in order to implement a location-specific security policy for an EMDM module 202. The method 1102 may include the user accepting 1102 an EMDM module 202 that includes a location-specific security policy. The location-specific security policy may specify a geofencing zone (GPS coordinates defining vertices of a polygon, a GPS coordinate and a radius, geographic entity, beacon identifiers, WI-FI access point identifier, identifier of other radio device, or other definition) as well as a security policy that applies within that zone.

If the PPMDM module 112 determines 1104 that the device 104 is within the zone associated with the EMDM module 202, the PPMDM module 112 will implement 1106 the security policy associated with the zone. The PPMDM module 112 may use the definition of the zone so that the PPMDM module 112 can determine whether the current location of the device 104 is now in an the zone.

In one example, a location-specific security policy may relate to basic capabilities of MDM APIs that allow for controlling the usage of a device's visual (camera) and audio (microphone) sensors, access to the device's clipboard, what permissions individual apps can have, etc. For example, some or all of these functions of the device 104 may be suppressed at an enterprise facility to prevent leaking of sensitive data.

When a user of the PPMDM module 112 grants an enterprise the rights to specify additional policies for use when the device is physically on the premises of the enterprise, then additional actions take place when such a device enters or exits the enterprise's physical premises. In some embodiments, upon detecting entrance of the device to the zone associated with a location-specific security policy, the PPMDM module 112 may output a notification on the device 104 that notifies the user that the user has entered the predefined zone, e.g., the enterprise's physical premises. The user can at this time agree to allow the location-specific polices to take effect or not.

The EMDM module 202 with the location-specific security policy may also is informed that the device 104 is now in the zone and informed whether the user of the PPMDM module has consented to allow the location-specific security policy to take effect or not. Where consent is not granted, the EMDM module 202 may notify the enterprise server system 102 such that remedial action may be taken, e.g., removing the user of the device 104, or the user's device 104, from the enterprise premises.

Figure 12:
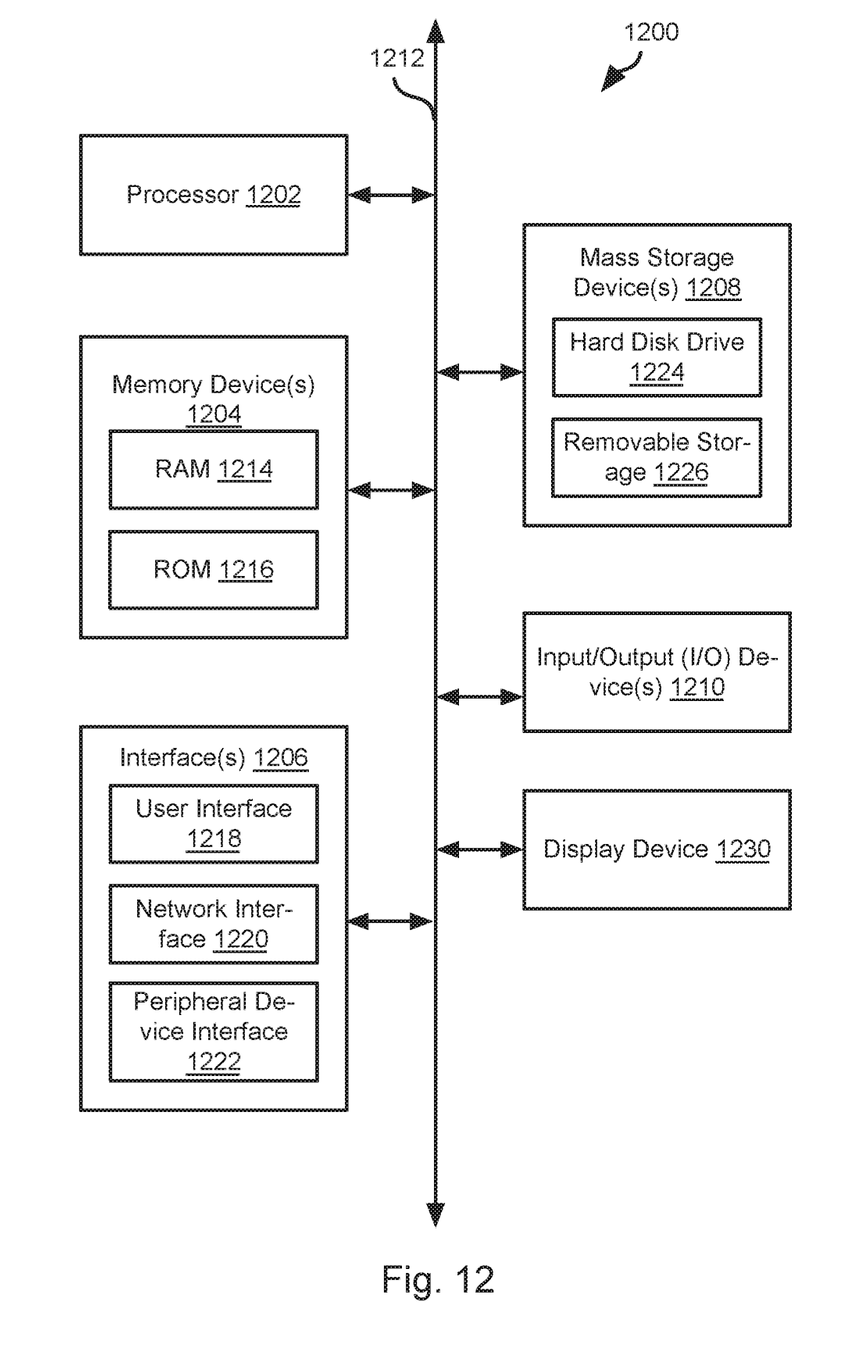
FIG. 12 is a schematic block diagram of a computer system suitable for implementing methods in accordance with embodiments of the present invention.

FIG. 12 is a block diagram illustrating an example computing device 1200 which can be used to implement the system and methods disclosed herein. The one or more computers of the server system 102 and the devices 104 may have some or all of the attributes of the computing device 1200. In some embodiments, a cluster of computing devices interconnected by a network may be used to implement any one or more components of the invention.

Computing device 1200 may be used to perform various procedures, such as those discussed herein. Computing device 1200 can function as a server, a client, or any other computing entity. Computing device can perform various monitoring functions as discussed herein, and can execute one or more application programs, such as the application programs described herein. Computing device 1200 can be any of a wide variety of computing devices, such as a desktop computer, a notebook computer, a server computer, a handheld computer, tablet computer and the like.

Computing device 1200 includes one or more processor(s) 1202, one or more memory device(s) 1204, one or more interface(s) 1206, one or more mass storage device(s) 1208, one or more Input/Output (I/O) device(s) 1210, and a display device 1230 all of which are coupled to a bus 1212. Processor(s) 1202 include one or more processors or controllers that execute instructions stored in memory device(s) 1204 and/or mass storage device(s) 1208. Processor(s) 1202 may also include various types of computer-readable media, such as cache memory.

Memory device(s) 1204 include various computer-readable media, such as volatile memory (e.g., random access memory (RAM) 1214) and/or nonvolatile memory (e.g., read-only memory (ROM) 1216). Memory device(s) 1204 may also include rewritable ROM, such as Flash memory.

Mass storage device(s) 1208 include various computer readable media, such as magnetic tapes, magnetic disks, optical disks, solid-state memory (e.g., Flash memory), and so forth. As shown in FIG. 12, a particular mass storage device is a hard disk drive 1224. Various drives may also be included in mass storage device(s) 1208 to enable reading from and/or writing to the various computer readable media. Mass storage device(s) 1208 include removable media 1226 and/or non-removable media.

I/O device(s) 1210 include various devices that allow data and/or other information to be input to or retrieved from computing device 1200. Example I/O device(s) 1210 include cursor control devices, keyboards, keypads, microphones, monitors or other display devices, speakers, printers, network interface cards, modems, lenses, CCDs or other image capture devices, and the like.

Display device 1230 includes any type of device capable of displaying information to one or more users of computing device 1200. Examples of display device 1230 include a monitor, display terminal, video projection device, and the like.

Interface(s) 1206 include various interfaces that allow computing device 1200 to interact with other systems, devices, or computing environments. Example interface(s) 1206 include any number of different network interfaces 1220, such as interfaces to local area networks (LANs), wide area networks (WANs), wireless networks, and the Internet. Other interface(s) include user interface 1218 and peripheral device interface 1222. The interface(s) 1206 may also include one or more user interface elements 1218. The interface(s) 1206 may also include one or more peripheral interfaces such as interfaces for printers, pointing devices (mice, track pad, etc.), keyboards, and the like.

Bus 1212 allows processor(s) 1202, memory device(s) 1204, interface(s) 1206, mass storage device(s) 1208, and I/O device(s) 1210 to communicate with one another, as well as other devices or components coupled to bus 1212. Bus 1212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1200, and are executed by processor(s) 1202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The invention claimed is:

1. A method comprising:
   executing, on a device, a private personal mobile device management module (PPMDM);
   receiving, by the private personal mobile device management module, an enterprise mobile device management (EMDM) policy from an enterprise server, the enterprise mobile device management (EMDM) policy representing requested access to a first resource and a second resource of the device by a mobile device management (MDM) software, the MDM software being programmed to monitor the device for security threats;
   permitting by the private personal mobile device management (PPMDM) module management of security of the first resource by the MDM software according to the enterprise mobile device management (EMDM) policy in cooperation with the enterprise server; and
   providing, by the private personal mobile device management module (PPMDM), data derived from a the second resource to the MDM software for management according to the enterprise mobile device management (EMDM) policy in cooperation with the enterprise server, wherein the second resource includes a detected threat on the device;
   providing an enterprise application installed on the device, the enterprise application being associated with the EMDM policy;
   providing a personal application installed on the device and not associated with the EMDM policy;
   managing, by the PPMDM module, the enterprise application according to the EMDM policy; and
   refraining, by the PPMDM module, from managing the personal application according to the EMDM policy.

2. The method of claim 1, wherein receiving the EMDM policy comprises receiving executable code programmed to implement the EMDM policy.

3. The method of claim 1, further comprising:
   detecting, by the PPMDM module, a network connection violating the EMDM policy; and
   in response to detecting the network connection violating the EMDM policy, blocking access to the network connection by the enterprise application while allowing access to the network connection by the personal application.

4. The method of claim 1, further comprising:
providing an enterprise data stored on the device, the enterprise data being associated with the EMDM policy; providing a personal data stored on the device and not associated with the EMDM policy;
managing, by the PPMDM module, the enterprise data according to the EMDM policy; and refraining, by the PPMDM module, from managing the personal data according to the EMDM policy.

5. The method of claim 4, further comprising:
determining, by the PPMDM module, that data associated with the EMDM policy should be deleted;
in response to determining, by the PPMDM module, that data associated with the EMDM policy should be deleted, deleting the enterprise data without deleting the personal data.

6. The method of claim 5, wherein determining that the data associated with the EMDM policy should be deleted comprises determining that the device has been stolen and that the EMDM policy requires wiping of the device in response to determining that the device has been stolen.

7. The method of claim 4, further comprising:
providing an enterprise application installed on the device; associating, by the PPMDM module, the enterprise application with the EMDM policy on the device; and
flagging, by the PPMDM module, data received by the enterprise application as the enterprise data.

8. The method of claim 4, wherein the EMDM policy specifies a zone, the method further comprising:
detecting, by the PPMDM module, a location of the device in the zone;
detecting, by the PPMDM module, capture of sensor data using the device while the device is in the zone; and
flagging, by the PPMDM module, the sensor data as enterprise data in response to detecting capture of the sensor data while the device is in the zone.

9. The method of claim 1, wherein the EMDM policy specifies a zone and a location-specific security policy associated with the zone, the method further comprising:
detecting, by the PPMDM module, a location of the device in the zone; and
in response to detecting the location of the device in the zone, implementing, by the PPMDM module, the location-specific security policy.

10. The method of claim 9, wherein the location-specific security policy requires disabling of one or more sensors of the device.

11. The method of claim 1, wherein the EMDM policy specifies blocking of access to a plurality of unsafe resources, the method further comprising:
detecting, by the PPMDM module, an attempt to access one or more unsafe resources of the plurality of unsafe resources;
blocking, by the PPMDM module the attempt to access the one or more unsafe resources;
providing, by the PPMDM module, a report of the attempt to an enterprise server, the report not identifying the one or more unsafe resources.

12. The method of claim 11, wherein the one or more unsafe resources include a uniform resource locator (URL).

13. The method of claim 1, wherein the EMDM policy is a first EMDM policy and received from a first enterprise server, the method further comprising:
receiving, by the PPMDM module, a second EMDM policy from a second enterprise server; and
implementing, by the PPMDM module, a combination of the first EMDM policy and the second EMDM policy only according to control inputs received from a user.

14. The method of claim 13, wherein implementing the combination of the first EMDM policy and the second EMDM policy comprises implementing restrictions from both of the first EMDM policy and the second EMDM policy.

15. The method of claim 13, further comprising:
associating, by the PPMDM module, a first enterprise application with the first EMDM policy;
associating, by the PPMDM module, a second enterprise application with the second EMDM policy;
implementing, by the PPMDM module, the first EMDM policy while the first enterprise application is in use; and
implementing, by the PPMDM module, the second EMDM policy while the second enterprise application is in use.

16. The method of claim 15, wherein the first EMDM policy includes a first requirement and the second EMDM policy includes a second requirement, the method further comprising:
associating, by the PPMDM module, a first enterprise application with the first EMDM policy;
associating, by the PPMDM module, a second enterprise application with the second EMDM policy;
determining, by the PPMDM module, that the first requirement is in conflict with the second requirement;
in response to determining that the first requirement is in conflict with the second requirement:
implementing, by the PPMDM module, the first EMDM policy while the first enterprise application is in use; and
implementing, by the PPMDM module, the second EMDM policy while the second enterprise application is in use.

17. The method of claim 1, wherein the second resource includes a location of the device and the data derived from the second resource does not include the location of the device.

18. The method of claim 1, wherein the second resource includes a threat prevention action and the data derived from the second resource indicates that the threat prevention action was performed with respect to the detected threat without specifying a nature of the threat prevention action.

* * * * *